(12) United States Patent
Argolini et al.

(10) Patent No.: US 9,212,613 B2
(45) Date of Patent: Dec. 15, 2015

(54) METHOD OF CONTROLLING AN EXHAUST GAS TEMPERATURE OF AN INTERNAL COMBUSTION ENGINE

(71) Applicant: GM GLOBAL TECHNOLOGY OPERATIONS LLC, Detroit, MI (US)

(72) Inventors: Roberto Argolini, Milan (IT); Giuseppe Schiavone, Bitonto (IT); Angela Vitiello, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/196,915

(22) Filed: Mar. 4, 2014

(65) Prior Publication Data

US 2014/0283502 A1 Sep. 25, 2014

(30) Foreign Application Priority Data

Mar. 4, 2013 (GB) .................................. 1303797.3

(51) Int. Cl.
*F01N 3/00* (2006.01)
*F02D 41/02* (2006.01)
*F02D 41/40* (2006.01)
*F02D 41/14* (2006.01)
*F01N 9/00* (2006.01)

(52) U.S. Cl.
CPC ........ *F02D 41/0245* (2013.01); *F02D 41/1446* (2013.01); *F02D 41/405* (2013.01); *F01N 9/002* (2013.01); *F01N 2560/06* (2013.01); *F01N 2900/1402* (2013.01); *F01N 2900/1602* (2013.01); *F02D 41/029* (2013.01); *F02D 41/1445* (2013.01); *F02D 2041/1409* (2013.01); *F02D 2041/1422* (2013.01); *Y02T 10/26* (2013.01); *Y02T 10/44* (2013.01)

(58) Field of Classification Search
USPC ............ 60/274, 286, 295, 297, 301, 303, 311
See application file for complete search history.

(56) References Cited

U.S. PATENT DOCUMENTS

| 7,065,960 | B2 * | 6/2006 | Gioannini et al. | 60/295 |
| 7,104,049 | B2 * | 9/2006 | Hiranuma et al. | 60/295 |
| 7,254,941 | B2 * | 8/2007 | Okugawa et al. | 60/297 |
| 7,784,275 | B2 * | 8/2010 | Marlett et al. | 60/295 |
| 8,490,388 | B2 * | 7/2013 | Parmentier et al. | 60/286 |
| 8,621,849 | B2 * | 1/2014 | Vernassa et al. | 60/288 |
| 8,793,980 | B2 * | 8/2014 | He et al. | 60/286 |
| 2005/0188686 | A1 | 9/2005 | Saito et al. | |
| 2008/0264037 | A1 | 10/2008 | Takahashi et al. | |

FOREIGN PATENT DOCUMENTS

| EP | 1245814 A2 | 10/2002 |
| EP | 1722088 A2 | 11/2006 |
| GB | 2467245 A | 7/2010 |
| JP | 2006316743 A | 11/2006 |

* cited by examiner

*Primary Examiner* — Binh Q Tran
(74) *Attorney, Agent, or Firm* — Ingrassia Fisher & Lorenz PC

(57) ABSTRACT

A method of controlling an exhaust gas temperature at a particulate filter inlet is disclosed. The particulate filter is located in an exhaust system of an internal combustion engine. The method of controlling exhaust gas temperature at the particulate filter inlet includes a late injection, whose quantity is estimated as function of an exhaust gas volumetric flowrate.

8 Claims, 4 Drawing Sheets

METHOD OF CONTROLLING AN EXHAUST GAS TEMPERATURE OF AN INTERNAL COMBUSTION ENGINE

CROSS REFERENCE TO RELATED APPLICATION

This application claims priority to British Patent Application No. 1303797.3 filed Mar. 4, 2013, which is incorporated herein by reference in its entirety.

TECHNICAL FIELD

The present disclosure relates to a method of controlling an exhaust gas temperature of an internal combustion engine. In particular, the method is dedicated to the temperature control at the inlet of a particulate filter.

BACKGROUND

It is known that modern engines are provided with one or more exhaust after-treatment devices. The after-treatment devices may be any device configured to change the composition of the exhaust gases, such as a diesel oxidation catalyst (DOC) located in the exhaust line for degrading residual hydrocarbons (HC) and carbon oxides (CO) contained in the exhaust gas, and a diesel particulate filter (DPF) located in the exhaust line downstream the DOC, for capturing and removing diesel particulate matter (soot) from the exhaust gas In particular, the diesel particulate filter collects liquid and solid particles in a porous substrate structure, while allowing exhaust gases to flow through. As it reaches its nominal storage capacity, needs to be cleaned by a process called regeneration. During such regeneration process, the exhaust gas temperature is increased, by means of late fuel injections, to create a condition whereby the pollutants, which have been accumulated in the filter are burned, i.e. oxidized. The process includes a closed-loop control typically on the DPF upstream temperature in order to maintain adequate temperatures in the exhaust line, optimizing the event against component drifts and ore external noises. Hereafter, with exhaust gas temperature at the particulate filter inlet (or, exhaust gas temperature at DPF inlet) will be intended the DPF upstream temperature, wherein for temperatures in other locations along the exhaust pipeline, we will refer as exhaust gas temperature.

Actual control strategies of the exhaust gas temperature at DPF inlet are mainly based on the engine working point, that is to say, one or more calibrated maps, based on engine speeds and loads are used. This means that such control strategies are not completely accounting for any exhaust gas physical change: exhaust gas mass flowrate, temperature and pressure. Since all these parameters are strictly connected to the dynamic response of the system, a control which is not based on them cannot optimize the trade-off between calibration effort and performances of the exhaust system.

In fact, the time response of an exhaust system, including a DOC or LNT device, when thermal stimulated through late injection quantities, is mainly related to the gas mass flowrate, gas temperature in the DOC/LNT and gas pressure. In an generic exhaust line, even at fixed engine speed and load, the exhaust gas mass flowrate, temperature and pressure could be much different: for example, during transient conditions, for corrections due to different ambient conditions or to components dispersion in production. Therefore, by using a control approach not directly considering the main parameters, which affects the dynamic of the system, it is not possible to optimize the performances in terms of thermal response and let the system be robust enough, especially in transient conditions.

Therefore a need exists for a method of controlling the exhaust gas temperature at the particulate filter inlet, which not consider anymore the single engine working conditions in terms of engine speed and load, but is more based on the physical behavior of the exhaust system and its time response characteristics, and is therefore able to control the temperature in order to reach the target in a faster way, avoiding undershoot and overshoot, maximizing the regeneration efficiency and reducing the risk of catalyst aging.

SUMMARY

An object of the present disclosure is to provide a method of controlling the exhaust gas temperature at the particulate filter inlet, which is based on the exhaust gas volumetric flowrate, wherein the volumetric flowrate is able to directly take into account any exhaust gas mass flowrate, pressure or temperature variations. Another object is to provide an apparatus which allows to perform the above method. These objects are achieved by a method, by an apparatus, by an engine, by a computer program and computer program product, and by an electromagnetic signal having the features recited in the independent claims.

An embodiment of the disclosure provides a method of controlling an exhaust gas temperature at a particulate filter inlet, the particulate filter being located in an exhaust system of an internal combustion engine, the method controlling said exhaust gas temperature at the particulate filter inlet by means of at least a late injection, whose quantity is estimated as function of an exhaust gas volumetric flowrate.

Consequently an apparatus is disclosed for implementing a method of controlling an exhaust gas temperature at a particulate filter inlet, the apparatus includes means for controlling said exhaust gas temperature at the particulate filter inlet by means of at least a late injection, whose quantity is estimated as function of an exhaust gas volumetric flowrate.

An advantage of this embodiment is that the control strategy does not consider the single engine working conditions in terms of engine speed and load, but is based on the physical behavior of the exhaust system and its time response characteristics, by using as input parameter for the temperature control the volumetric flowrate of the exhaust gas. The method is therefore able to control the temperature in order to reach the target in a faster way, avoiding undershoot and overshoot, maximizing the regeneration efficiency and reducing the risk of catalyst aging.

According to an embodiment the late injection quantity is the sum of a proportional, an integral and a derivative contribute, each of them based on the exhaust gas volumetric flowrate and on a temperature error between a set-point of the exhaust gas temperature at the particulate filter inlet and a measured exhaust gas temperature at the particulate filter inlet. An advantage of this embodiment is that all contributes for determining the controlling variable (late injection quantity) for the temperature controls, are based on said volumetric flowrate of the exhaust gas, i.e. based on a physical behavior of the system.

According to another embodiment, the proportional contribute is obtained by multiplying a first contribute, which is function of said exhaust gas volumetric flowrate with a second contribute, which is function of said temperature error. An advantage of this embodiment is that the proportional contribute to the late injection quantity, which is based on the volumetric flowrate is also corrected by a temperature error.

According to a further embodiment, a maximum late injection quantity in closed loop control is obtained by multiplying a first contribute, which is function of the exhaust gas volumetric flowrate with a second contribute, which is function of said exhaust gas temperature at the particulate filter inlet. An advantage of this embodiment is that the maximum late injection quantity in closed loop control, which is based on the volumetric flowrate, is also correct by the exhaust gas temperature at the particulate filter inlet According to a still further embodiment, a minimum late injection quantity in closed loop control is obtained by multiplying a first contribute, which is function of the exhaust gas volumetric flowrate with a second contribute, which is function of said exhaust gas temperature at the particulate filter inlet. An advantage of this embodiment is that a minimum late injection quantity in closed loop control, which is based on the volumetric flowrate, is also correct by the exhaust gas temperature at the particulate filter inlet.

According to still another embodiment the exhaust gas volumetric flowrate of the is calculated as function of an exhaust gas mass flowrate, an exhaust gas pressure and an exhaust gas temperature, according to the following equations:

$$\rho = \frac{p}{R \cdot T} \text{ and } \dot{V} = \frac{\dot{m}}{\rho}$$

In this way any combination of temperature, mass flowrate and pressure having the same volumetric flowrate will be treated correctly in the same way from the control point of view, since the natural system has the same behavior, while combination of temperature, mass flowrate and pressure leading to different volumetric flowrate will be differently controlled since the response of the system will be different.

Another embodiment of the disclosure provides an internal combustion engine of an automotive system equipped with an exhaust system, having at least an after-treatment device. The after-treatment device is preferably a particulate filter. The exhaust system also includes at least a temperature sensor. The automotive system includes an electronic control unit configured for carrying out the method according to one of the previous embodiments.

The method according to one of its aspects can be carried out with the help of a computer program including a program-code for carrying out the method described above, and in the form of computer program product including the computer program. The computer program product can be embodied as a control apparatus for an internal combustion engine, comprising an Electronic Control Unit (ECU), a data carrier associated to the ECU, and the computer program stored in a data carrier. The control apparatus defines the embodiments described in the same way as the method. In this case, when the control apparatus executes the computer program such that the method described above are carried out.

The method according to a further aspect can be also embodied as an electromagnetic signal being modulated to carry a sequence of data bits which represents a computer program to carry out the method described above.

BRIEF DESCRIPTION OF THE DRAWINGS

The present disclosure will hereinafter be described in conjunction with the following drawing figures, wherein like numerals denote like elements, and.

DETAILED DESCRIPTION OF THE DRAWINGS

The following detailed description is merely exemplary in nature and is not intended to limit the present disclosure or the application and uses of the present disclosure. Furthermore, there is no intention to be bound by any theory presented in the preceding background of the following detailed description.

Figure 1:
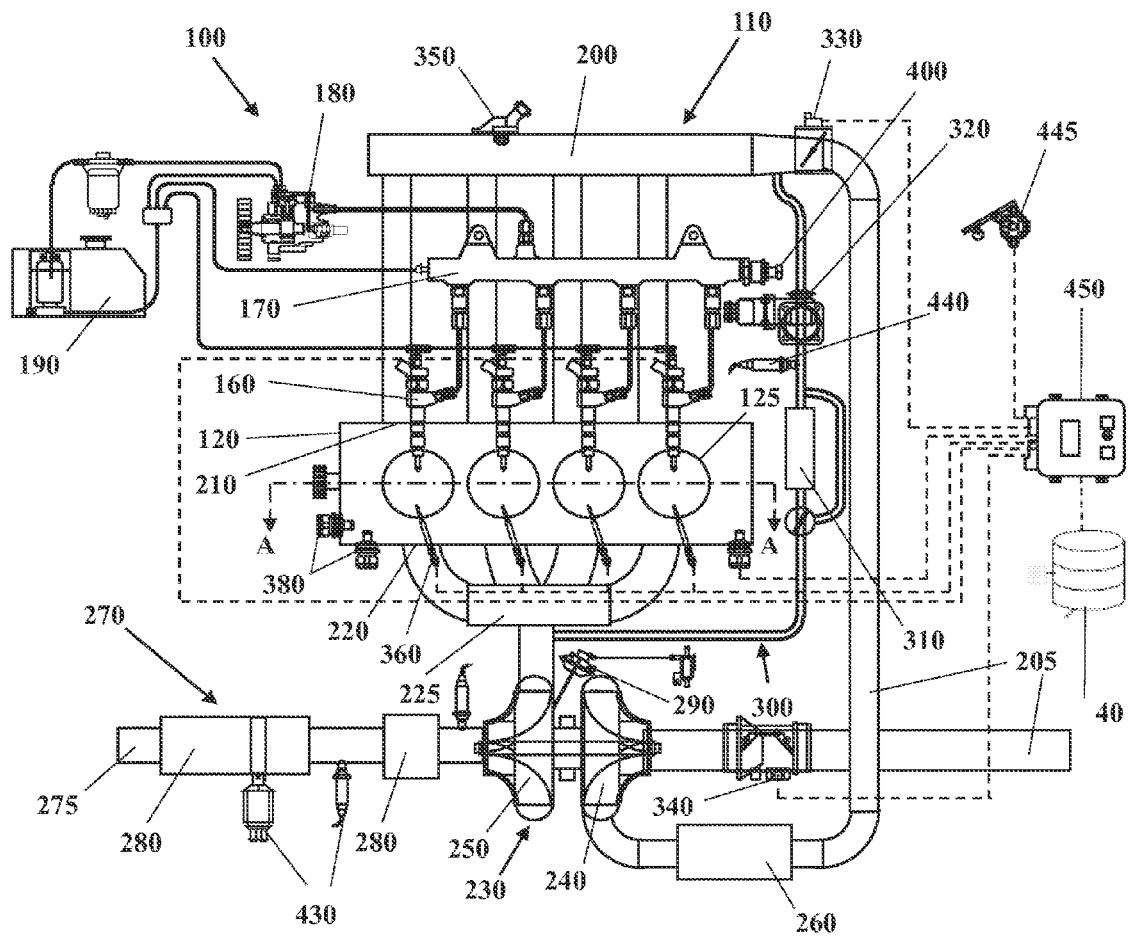
FIG. 1 shows an automotive system.
Figure 2:
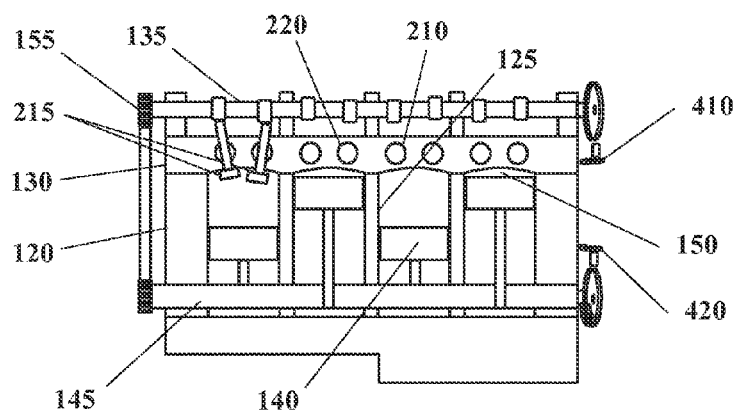
FIG. 2 is a section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean NOx traps 281, hydrocarbon adsorbers, selective catalytic reduction (SCR) systems 282, particulate filters (DPF) or a combination of the last two devices, i.e. selective catalytic reduction system includes a particulate filter (SCRF) 283. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110 and equipped with a data carrier 40. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and mass sensors 430, temperature sensors 285, 286, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout the steps of such methods and control the ICE 110.

Figure 3:
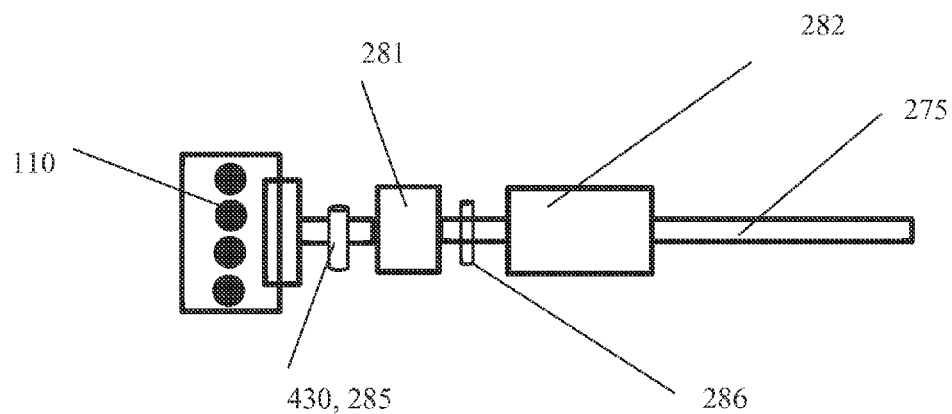
FIG. 3 is a schematic view of the after-treatment system according to the invention.

Turning back to exhaust system 270, the proposed invention is a method to define a new control strategy for the exhaust gas temperature Tdpf at the particulate filter inlet, able to consider all the parameters that are affecting the dynamic, with an increased robustness of the control. The new approach wants to be independent on a single engine working condition and instead be based only on the physic behavior of the system and its time response characteristics. FIG. 3 shows the scheme of the after-treatment system 280, including a particulate filter (DPF) 282 to trap particulate emitted and, advantageously, also including a diesel oxidation catalyst (DOC) or a Lean NOx Trap (LNT) 281. Upstream the DOC/LNT, mass and pressure sensors 430 and a temperature sensor 285 can be provided. Upstream the DPF 282, a further temperature sensor 286 can be provided as well.

Figure 4:
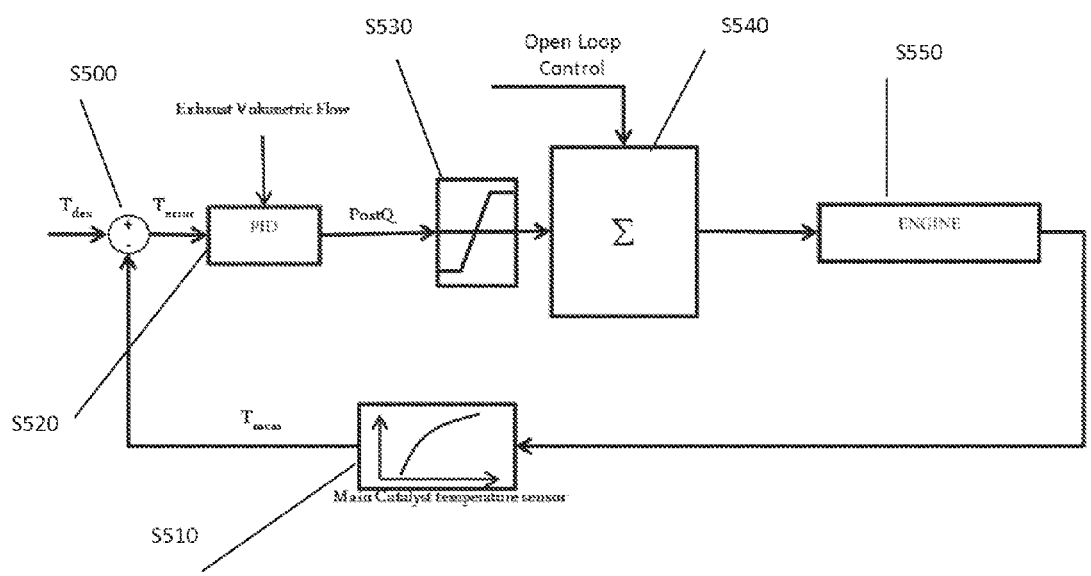
FIG. 4 is a block diagram of the exhaust temperature control at the particulate filter inlet.

The temperature control strategy is based on the block diagram of FIG. 4. The exhaust gas volumetric flow $\dot{V}$ as input of a PID controller. More in detail, in this control logic the exhaust gas temperature Tdef at the particulate filter inlet is the controlled variable, while at least a late fuel injection quantity PostQ is the controlling variable. As known, for late fuel injection has to be intended a fuel quantity which is injected in the engine cylinder 125 when the exhaust port 220 is already open. In other words, this late injection does not contribute to the engine torque, but its effect is only to increase the temperature in the exhaust line, just to create the conditions for a regeneration process in after-treatment devices. The logic compares S500 the set-point of the exhaust gas temperature Tdes at the DPF inlet with a measured S510 exhaust gas temperature Tmeas (measured for example by the temperature sensor 286, always at the DPF inlet). The related temperature error Terror, together with the exhaust gas volumetric flowrate is entered as input of a known PID controller S520, whose proportional Kp, integral Ki and derivative Kd contributes will give as output the value of the late injection fuel quantity. Then, a check on the maximum and minimum quantity amount is performed in S530 and finally a late injection fuel quantity in open loop control is summed S540. The determined fuel quantity is then injected S550 in the engine and the consequent measured exhaust gas temperature at the DPF inlet will be the response of the exhaust system.

As mentioned, the aim of the present disclosure is to implement a temperature control strategy based on exhaust volumetric flowrate. In fact in the illustrated block diagram, everything is known but the input of the PID controller S520: instead of a map of engine working points (engine speeds, engine loads), a map based on the volumetric flowrate, as input parameter, is introduced. This concept is linked to the fact that the system time response is mainly related to mass flowrate, temperature and pressure states in the exhaust line, therefore tuning the control action with the volumetric flowrate allows to be always aligned with the current system dynamic response.

The exhaust gas volumetric flowrate is calculated by the exhaust gas mass flowrate, using the known formula of the gas state equation:

$$\rho = \frac{p}{R \cdot T} \text{ and } \dot{V} = \frac{\dot{m}}{\rho}$$

where:
p=exhaust gas pressure
T=exhaust gas temperature
ρ=exhaust gas density
$\dot{V}$=exhaust volumetric flowrate
$\dot{m}$=exhaust mass flowrate All input parameters (pressure, temperature and mass flowrate) are available by means of respective sensor 430, 285, 286 measurements and/or estimating known models.

The choice of the volumetric flowrate as input parameter of the DPF inlet temperature controller instead of, for example, the mass flowrate is due to the following consideration: without control action and operating at fixed engine operating point, in case a late injection quantity changes (which can be considered as external disturbance for the temperature), the exhaust gas temperature increases/decreases accordingly. Experimental tests, clearly shows the difference in considering only the mass flowrate or the volumetric flowrate in the same engine point with different exhaust gas temperature conditions: for small exhaust mass flow variation, a corresponding consistent volumetric flow variation arises. This means that control parameters, as function of volumetric flowrate, can take into account this temperature variation, in other words an adaptive temperature control can be realized.

Figure 5:
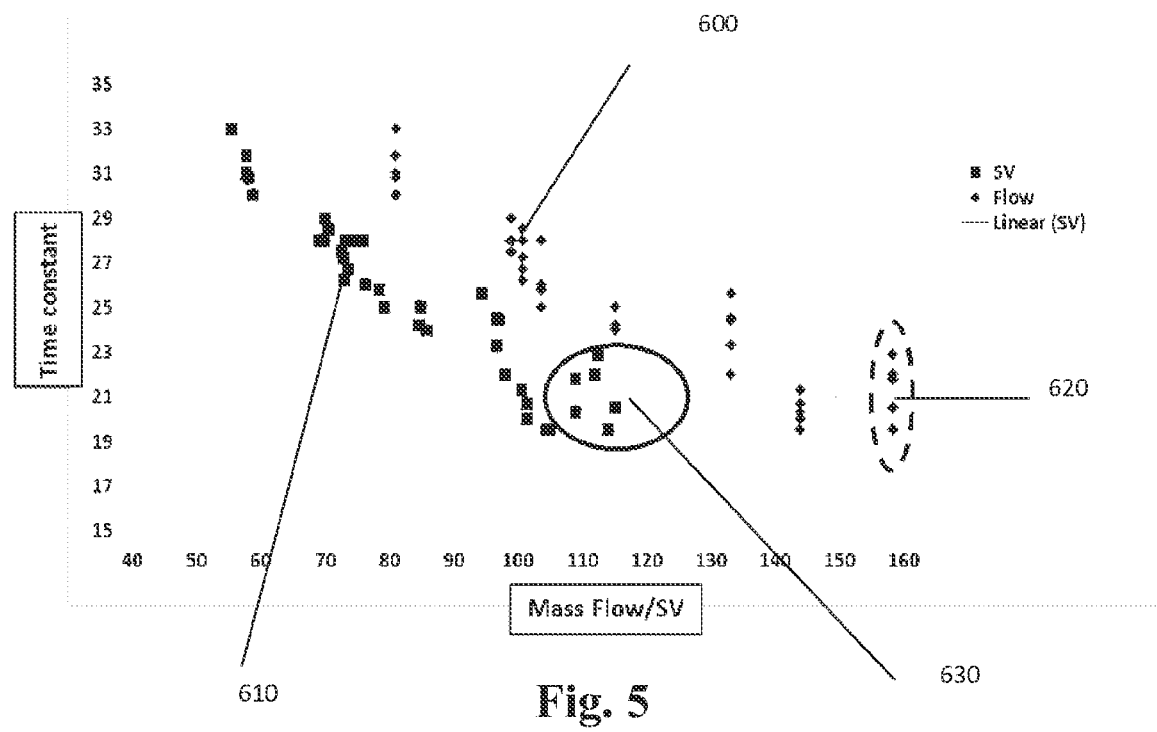
FIG. 5 is a graph depicting the behavior of a time constant vs. mass flowrate and volumetric flowrate.

As known, a time constant of a control process is evaluated in open loop, changing the controlling variable (late injection quantities in our case) and measuring the time needed to reach 63% of desired value. FIG. 5 shows the time constant vs. exhaust mass flowrate 600 and exhaust volumetric flow rate 610. It is evident the advantage of having less dispersion (R squared closer to 1), by using the volumetric flowrate. This lead to faster control actions and consequently less overshoot/undershoot in temperature profile. Moreover, as shown in the same figure, in case of mass flowrate a single value corresponds to more than one time constant values 620. Therefore, since a control action can be calibrated using just one time constant value for each exhaust mass flowrate, only an average value can be chosen. On the other side, there is an almost bi-univocal correspondence 630 between volumetric flowrate and time constant: this allows more flexibility in calibration. Having different time constants at different volumetric flowrate means that control actions can be calibrated to match system behavior and be faster at highest volumetric flowrate.

Figure 6:
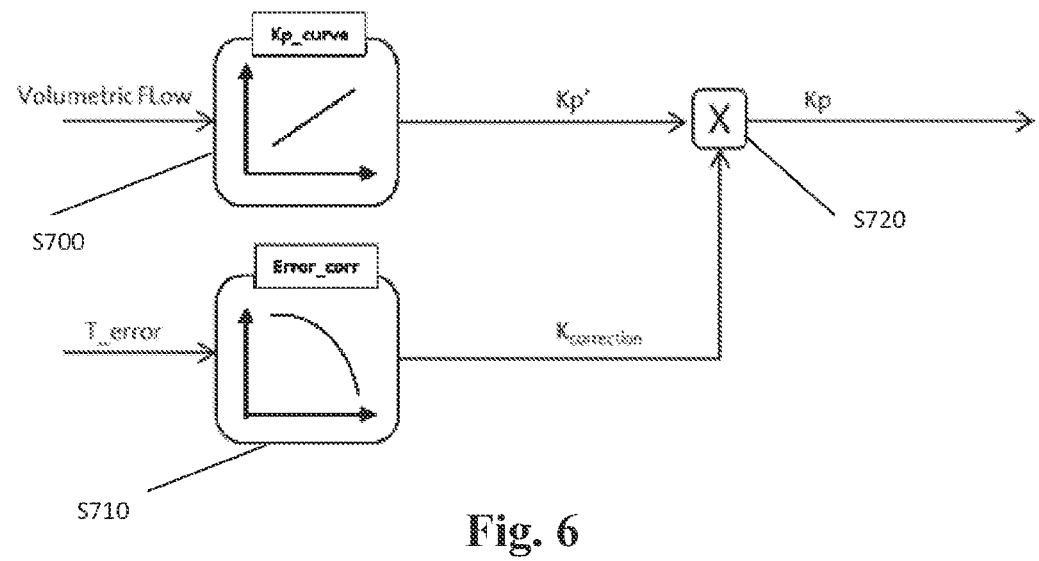
FIG. 6 is a first detail of the block diagram of FIG. 4.

Therefore, the present disclosure provides a method of controlling exhaust gas temperature at the particulate filter inlet by introducing the volumetric flowrate $\dot{V}$ as an input of the PID controller S520, which calculates a late injection quantity. In FIG. 6 is shown the contribute to the late injection quantity of the PID proportional factor Kp (but the same occurs for the other two contributes, Ki and Kd): a first map 700 has the volumetric flowrate $\dot{V}$ values as input parameter and a first contribute to the proportional factor K'p as output. A second map 710 has the temperature error Terror values (difference S500 between the temperature set-point value Tdes and the measured S510 temperature Tmeas) as input parameter and a second contribute to the proportional factor Kcorrection as output. By multiplying 720 K'p per Kcorrection the value Kp of the proportional factor is obtained.

Figure 7:
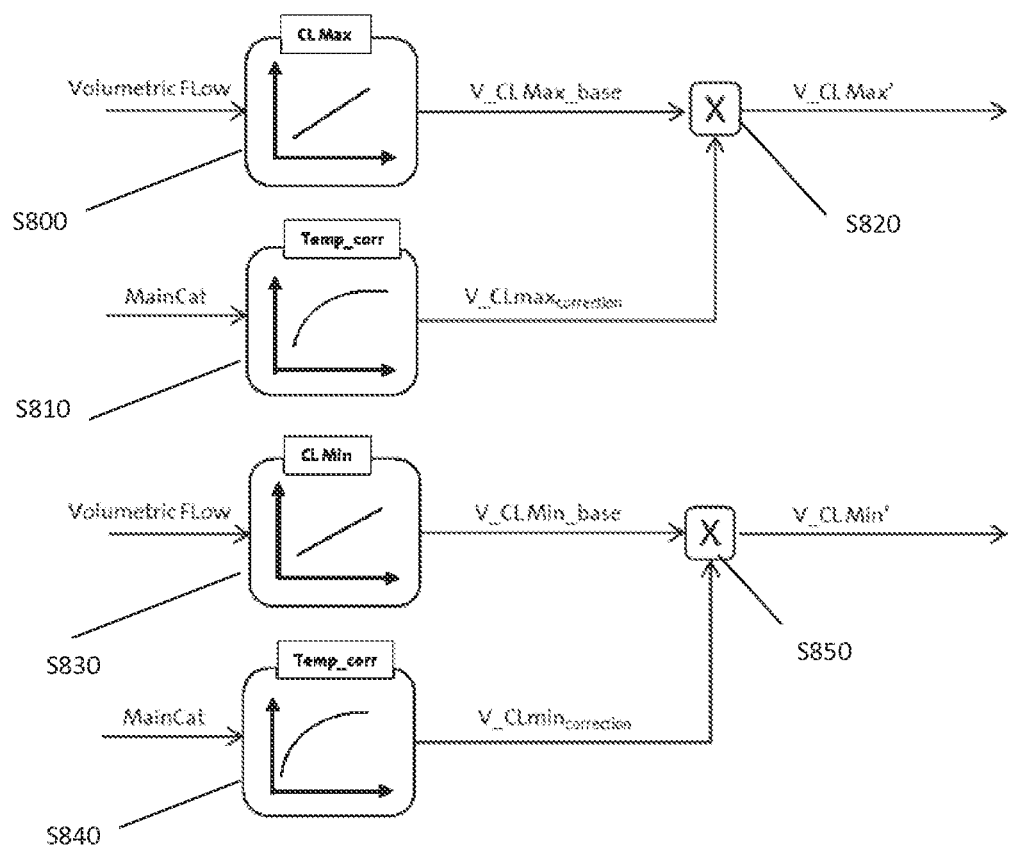
FIG. 7 is a second detail of the block diagram of FIG. 4.

In FIG. 7 is shown how the check on the maximum and minimum quantity amount 530 is performed. The limitation of maximum amount of fuel in closed loop control is actuated to avoid to high fuel quantity with respect to the oxygen which is present in the exhaust, while the limitation on the minimum amount of fuel in closed loop control is actuated to avoid negative values (as sum of the closed loop and open loop control). In the case of max. limitation, a first map S800 has the volumetric flowrate values $\dot{V}$ as input parameter and a first contribute to the max. late injection quantity in closed loop control, V_CLMax_base, as output. A second map S810 has the values of the exhaust gas temperature Tdpf at the particulate filter inlet as input parameter and a second contribute to the max. late injection quantity in closed loop control, V_CLMax_correction, as output. Multiplying S820 V_CLMax_base by V_CLMax_correction, the value V_CLMax of the max. late injection quantity in closed loop control is obtained. In the same way is treated the case of min. limitation: a first map S830 has the volumetric flowrate $\dot{V}$ values as input parameter and a first contribute to the min. late injection quantity in closed loop control, V_CLMin_base, as output. A second map S840 has the values of the exhaust gas temperature Tdpf at a particulate filter inlet as input parameter and a second contribute to the min. late injection quantity in closed loop control, V_CLMin_correction, as output. Multiplying S850 V_CLMin_base by V_CLMin_correction, the value V_CLMin of the min. late injection quantity in closed loop control is obtained.

Figure 8:
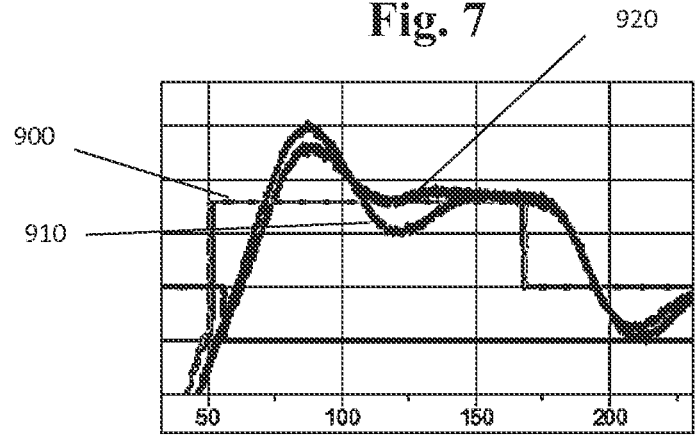
FIG. 8 is a graph comparing the old and the new temperature control strategy.

In FIG. 8 a comparison between the old and the new control strategies has been carried out. Starting a DPF regeneration at the same temperature condition and changing in the same way the temperature target 900, which represents the external disturbance of the system, the temperature controlled using the new approach 920 shows less overshoot/undershoot than a standard control 910 and reaches the temperature target in a lower time interval.

Summarizing, with the present disclosure it is therefore possible to faster control the exhaust gas temperature at the particulate filter inlet in order to reach the target, avoiding undershoot and overshoot, maximizing the regeneration efficiency and reducing the risk of catalyst aging with an increased robustness in terms of deviation of temperatures, pressures and mass flowrate respect to the nominal case.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A method of controlling an exhaust gas temperature at a particulate filter inlet, comprising:
   providing a particulate filter in an exhaust system of an internal combustion engine, the particulate filter having the particulate filter inlet;
   determining, with a processor of an electronic control unit, only a quantity of fuel for a late injection based on an exhaust gas volumetric flow rate; and
   controlling, with the processor, said exhaust gas temperature at the particulate filter inlet by injecting the determined quantity of fuel into a cylinder of the internal combustion engine.

2. The method according to claim 1, wherein said late injection quantity comprises the sum of a proportional contribute, an integral contribute and a derivative contribute, each contribute based on said exhaust gas volumetric flowrate and a temperature error between a set-point of the exhaust gas temperature at the particulate filter inlet and a measured exhaust gas temperature at the particulate filter inlet.

3. The method according to claim 2, wherein said proportional contribute is obtained by multiplying a first contribute, which is function of said exhaust gas volumetric flowrate with a second contribute, which is function of said temperature error.

4. The method according to claim 1, wherein a maximum late injection quantity in closed loop control is obtained by multiplying a first contribute, which is function of said exhaust gas volumetric flowrate with a second contribute, which is function of said exhaust gas temperature at the particulate filter inlet.

5. The method according to claim 1, wherein a minimum late injection quantity in closed loop control is obtained by multiplying a first contribute, which is function of said volumetric flowrate of the exhaust gas with a second contribute, which is function of said exhaust gas temperature at the particulate filter inlet.

6. The method according to claim 1, wherein said exhaust gas volumetric flowrate is calculated as function of an exhaust gas mass flowrate, an exhaust gas pressure and an exhaust gas temperature, according to the following equations:

$$\rho = \frac{p}{R \cdot T} \text{ and } \dot{V} = \frac{\dot{m}}{\rho}$$

where:
p=exhaust gas pressure;
T=exhaust gas temperature;
ρ=exhaust gas density;
V̇=exhaust volumetric flowrate; and
ṁ=exhaust mass flowrate.

7. An internal combustion engine of an automotive system equipped with an exhaust system comprising:
   a particulate filter disposed in the exhaust system, the particulate filter having a particulate filter inlet;
   an exhaust port in communication with the internal combustion engine that receives exhaust gas, the exhaust port opened by a valve;
   a temperature sensor located upstream from the particulate filter inlet; and
   an electronic control unit having a processor that controls an exhaust gas temperature at the particulate filter inlet to regenerate the particulate filter, the electronic control unit determines only a quantity of fuel for a late injection based on an exhaust gas volumetric flow rate, and injects the determined quantity of fuel into a cylinder of the internal combustion engine when the exhaust port is opened.

8. A control apparatus for an internal combustion engine, comprising:
   an electronic control unit having a processor that executes a program for controlling exhaust gas temperature at a particulate filter inlet, the processor determines only a quantity of fuel for a late injection based on an exhaust gas volumetric flow rate, and injects the determined quantity of fuel into a cylinder of the internal combustion engine.

* * * * *